(12) United States Patent
Yu et al.

(10) Patent No.: US 9,392,235 B2
(45) Date of Patent: Jul. 12, 2016

(54) EXPLICIT WAY FOR SIGNALING A COLLOCATED REFERENCE PICTURE FOR VIDEO CODING

(71) Applicant: Google Technology Holdings LLC, Mountain View, CA (US)

(72) Inventors: Yue Yu, San Diego, CA (US); Xue Fang, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 505 days.

(21) Appl. No.: 13/753,388

(22) Filed: Jan. 29, 2013

(65) Prior Publication Data

US 2013/0202034 A1 Aug. 8, 2013

Related U.S. Application Data

(63) Continuation-in-part of application No. 13/680,531, filed on Nov. 19, 2012, and a continuation-in-part of application No. 13/681,237, filed on Nov. 19, 2012, and a continuation-in-part of application No. 13/681,254, filed on Nov. 19, 2012.

(60) Provisional application No. 61/595,061, filed on Feb. 4, 2012.

(51) Int. Cl.
*H04N 19/103* (2014.01)
*H04N 19/174* (2014.01)
(Continued)

(52) U.S. Cl.
CPC ......... *H04N 7/26047* (2013.01); *H04N 19/114* (2014.11); *H04N 19/50* (2014.11); *H04N 19/577* (2014.11); *H04N 19/70* (2014.11)

(58) Field of Classification Search
CPC . H04N 19/70; H04N 19/52; H04N 19/00569; H04N 19/174; H04N 21/23424; H04N 21/44016; H04N 21/8455; H04N 19/0089; H04N 7/26047
USPC .................................................... 375/240.12
See application file for complete search history.

(56) References Cited

U.S. PATENT DOCUMENTS 7,970,058 B2 * 6/2011 Suzuki ................. H04N 19/176
375/240.12
2003/0058238 A1 3/2003 Doak et al.
(Continued)

FOREIGN PATENT DOCUMENTS

EP 1422946 5/2004
WO WO2011050641 5/2011

OTHER PUBLICATIONS

Yu Y et al.: "AHG21: The Improvements on Reference Picture Buffering and List Construction", Joint Collaborative Team on Video Coding of ISO/IEC JTC1/SC29/WG11 and ITU-T SG.16, No. JCTVC-G717-r1, Nov. 24, 2011, JCT-VC Meeting; Nov. 21, 2011-Nov. 30, 2011 Geneva; 98, MPEG Meeting retrieved from the Internet: URL:HTTP://WFTP3.ITU.INT/AV-ARCH/JCTVC-SITE/2011_11_G_GENEVA/ [retrieved on May 23, 2013], all pages.
(Continued)

*Primary Examiner* — Sath V Perungavoor
*Assistant Examiner* — Howard D Brown, Jr.
(74) *Attorney, Agent, or Firm* — Young Basile Hanlon & MacFarlane, P.C.

(57) ABSTRACT

In one embodiment, a method for use in encoding and decoding a group of pictures in a video stream is provided. The method identifies a current picture in the group of pictures for encoding or decoding and determines a slice type for the current picture. When the slice type for the current picture is not equal to an I-type, the method identifies a collocated reference picture in the group of pictures using a syntax to determine if a collocated reference picture index should be accessed to identify the collocated reference picture and uses the collocated reference picture to encode or decode the current picture.

24 Claims, 11 Drawing Sheets

(51) Int. Cl.
*H04N 19/577* (2014.01)
*H04N 19/50* (2014.01)
*H04N 19/70* (2014.01)
*H04N 19/114* (2014.01)

(56) References Cited

U.S. PATENT DOCUMENTS

| | | | |
|---|---|---|---|
| 2003/0107815 A1* | 6/2003 | Redmond | 359/619 |
| 2005/0013365 A1 | 1/2005 | Mukerjee et al. | |
| 2005/0046702 A1* | 3/2005 | Katayama et al. | 348/222.1 |
| 2005/0053137 A1 | 3/2005 | Holcomb | |
| 2005/0117646 A1 | 6/2005 | Joch et al. | |
| 2005/0152452 A1* | 7/2005 | Suzuki | 375/240.16 |
| 2005/0232356 A1 | 10/2005 | Gomi et al. | |
| 2005/0276448 A1* | 12/2005 | Pryor | 382/103 |
| 2006/0104349 A1 | 5/2006 | Joch et al. | |
| 2006/0219857 A1 | 10/2006 | Satterfield | |
| 2006/0233252 A1 | 10/2006 | Bhattacharya et al. | |
| 2007/0063997 A1 | 3/2007 | Scherer et al. | |
| 2007/0286281 A1 | 12/2007 | Tsuchiya et al. | |
| 2008/0136923 A1 | 6/2008 | Inbar et al. | |
| 2008/0267290 A1 | 10/2008 | Barbieri et al. | |
| 2009/0003446 A1* | 1/2009 | Wu | H04N 19/176 375/240.16 |
| 2009/0021588 A1 | 1/2009 | Border et al. | |
| 2009/0080535 A1 | 3/2009 | Yin et al. | |
| 2009/0087111 A1 | 4/2009 | Noda et al. | |
| 2009/0129472 A1 | 5/2009 | Panusopone et al. | |
| 2009/0168886 A1 | 7/2009 | Ikeda et al. | |
| 2010/0111182 A1 | 5/2010 | Karczewicz et al. | |
| 2010/0128995 A1 | 5/2010 | Drugeon et al. | |
| 2011/0002389 A1 | 1/2011 | Xu et al. | |
| 2011/0110428 A1 | 5/2011 | Chang et al. | |
| 2011/0228852 A1 | 9/2011 | Budagavi | |
| 2012/0082229 A1 | 4/2012 | Su et al. | |
| 2012/0236942 A1 | 9/2012 | Lin et al. | |
| 2012/0250773 A1 | 10/2012 | Chien et al. | |
| 2013/0128967 A1* | 5/2013 | Yu | H04N 19/00569 375/240.12 |
| 2013/0128969 A1 | 5/2013 | Yu et al. | |
| 2013/0128970 A1 | 5/2013 | Yu et al. | |
| 2013/0128977 A1 | 5/2013 | Yu et al. | |
| 2013/0163663 A1 | 6/2013 | Yu et al. | |
| 2013/0182769 A1* | 7/2013 | Yu | H04N 19/00587 375/240.16 |
| 2013/0243092 A1* | 9/2013 | Sugio | H04N 19/00696 375/240.16 |
| 2013/0272375 A1 | 10/2013 | Yu et al. | |
| 2013/0272406 A1 | 10/2013 | Yu et al. | |
| 2014/0023142 A1 | 1/2014 | Yu et al. | |
| 2014/0056356 A1 | 2/2014 | Yu et al. | |

OTHER PUBLICATIONS

Hellman T et al.: "Limiting Collocated Temporal Reference to One Per Picture", Joint Collaborative Team on Video Coding of ISO/IEC JTC1/SC29/WG11 and ITU-T SG.16, No. JCTVC-H0442, Jan. 20, 2012, JCT-VC Meeting; 99, MPEG Meeting; Jan. 2, 2012—10-22012; San Jose Retrieved from the Internet: URL:HTTP://WFTP3.ITU.INT/AV-ARCH/JCTVC-SITE/[retrieved on May 23, 2013], all pages.
Bross B et al: "WD4: Working Draft 4 of High-Efficiency Video Coding", (Joint Collaborative Team on Video Coding of ISO/IEC JTC1/SC29/WG11 and ITU-T SG.16, No. JCTVC-F803, Sep. 8, 2011, JCT-VC Meeting; 97. MPEG Meeting; Jul. 14, 2011-Jul. 22, 2011; Torino; Retrieved from the Internet: URL:HTTP://WFTP3.ITU.INT/AV-ARCH/JCTVC-SITE/[retrieved on May 23, 2013], all pages.
Sjaberg R et al.: "Absolute signaling of reference pictures", Joint Collaborative Team on Video Coding of ISO/IEC JTC1/SC29/WG11 and ITU-T SG.16, No. JCTVC-F493 Jul. 22, 2011, JCT-VC Meeting; 97. MPEG Meeting; Jul. 14, 2011-Jul. 22, 2011, Retrieved from the Internet: URL:HTTP://WFTP3.ITU.INT/AV-ARCH/JCTVC-SITE/ [retrieved on May 23, 2013] all pages.
Fang S. et al.: "The Construction of Combined List for HEVC", Joint Collaborative Team on Video Coding of ISO/IEC JTC1/SC29/WG11 and ITU-T SG.16, No. JCTV-F573 Jul. 16, 2011, JCT-VC Meeting; 97. MPEG Meeting; Jul. 14, 2011-Jul. 22, 2011, Retrieved from the Internet: URL:HTTP://WFTP3.ITU.INT/AV-ARCH/JCTVC-SITE/ [retrieved on May 23, 2013], all pages.
Patent Cooperation Treaty, International Search Report and Written Opinion of the International Searching Authority for International Application No. PCT/US2013/024294, Jul. 3, 2013, 13 pages.
Bross B et al: "High Efficiency Video Coding (HEVC) text specification draft 6", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,, No. JCTVC-H1003, Feb. 10, 2012, all pages.
Bross, Benjamin et al.: "High Efficiency Video Coding (HEVC) text specification draft 7," Joint Collaborative Team on Video Coding(JCT-VC) of ISO/IEC JTC1/SC29/WG11 and ITU-T SG16 WP3, 9th Meeting : Geneva, CH, Apr. 27-May 7, 2012, JCTVC-I1003_d9, 278 pages.
Byeong-Moon Jeon. Alexixs Michael Tourapis:"B pictures in JVT" 4. JVT Meeting; 61.MPEG Meeting; Jul. 22, 2002-Jul. 26, 2002; Klagenfurt. AT; (Joint Video Team of ISO/IEC JTCI/SC29/WG11 and ITU-T SG.16), No. JVT-DI55. Jul. 26, 2002, PX030005418.
Guillaume Laroche et al.: "On memory compression for motion vector prediction", 20110310, No. JCTVC0E221, Mar. 10, 2011 all pages.
I-L Kim et al.:"Restriction on motion vector scaling for Merge and AMVP", 8. JCT-VC Meeting; 98. MPEG Meeting; Nov. 21, 2011-Nov. 28, 2011; Geneva; (Joint Collaborative Team on Video Coding of Iso/IEC JTCI/SC29/WG11 and ITU-T-SG.16);URL:http://wftp3.itu.int/av-arch/jctvc-site/, No. JCTVC-G551. Nov. 8, 2011 XP030110535.
IPRP, & Written Opinion of the International Searching Authority for International Application No. PCT/US2013054965, Feb. 15, 2015, 8 pages.
ISR and Written Opinion of the International Searching Authority for International Application No. PCTUS2012066146, Feb. 20, 2013, 15 pages.
ISR & Written Opinion RE: application PCTUS2012070871 dated Mar. 19, 2013, 15 pages.
ISR and Written Opinion of the International Searching Authority for International Application No. PCTUS2012065850, Feb. 27, 2013, 17 pages.
ISR, "ISR Search Report and Written Opinion of the International Searching Authority" for International Application No. ISR/US2013055968 dated Nov. 22, 2013 , 9 pages.
ISR, & Written Opinion of the International Searching Authority fo International Application No. ISR/US2012/065699, Jan. 25, 16 Pages.
ISR, & Written Opinion of the International Searching Authority for International Application No. ISR/US2013025988, May 14, 2013, 11 pages.
ISR, & Written Opinion of the International Searching Authority for International Application No. ISR/US2013025994, May 15, 2013, 12 pages.
ISR, & Written Opinion of the International Searching Authority for International Application No. ISR/US2013054965, Oct. 22, 2013, 12 pages.
Jian-Liang Lin et al.:"Motion vector coding techniques for HEVC", Multimedia Signal Processing (MMSP), 2011 IEE 13th International Workshop on. IEEE Oct. 17, 2011. pp. 1-6, XP03202755.
J-L Lin et al.: "Syntax for AMVP Parsing Error Control", 95. MPEG Meeting; Jan. 24, 2011-Jan. 28, 2011; DAEGU; (Motion Ipcture Expert Group or ISO/IEC JTC1/SC29/WG11),, No. m18878, Jan. 23, 2011, all pages.
J-L Lin et al.:"Improved Advanced Motion Vector Prediction", 4. JCT-VC Meeting; 95. MPEG Meeting; Jan. 20, 2011-Jan. 28, 2011;Daegu;(Joint Collaborative Team on Video Coding of ISO/IEC JTC1/SC29/WG11 and ITU-T SG.16); URL:http://wftp3.itu.int/av-arch/jctvc-site/, No. JCTVC-D125. Jan. 15, 2011 XP030008165.

(56) References Cited

OTHER PUBLICATIONS

Jung J et al.: Temporal MV predictor modification for MV-Comp, Skip Direct and Merge schemes, 4. JCT-VC Meeting; 95, MPEG Meeting; Jan. 20, 2011-Jan. 28, 2011; Daegu; (Joint Collaborative Team on Video Coding of ISO/IEC JCT1/SC29/WG11 and ITU-T SG16); URL; http://wftp3.itu.int/av-arch/jctvc-site/, No. JCTVC-D164, Jan. 15, 2011, all pages.
Kadono: "Memory Reduction for Temporal Direct Mode", 5, JVT Meeting; Oct. 14, 2010-Oct. 18, 2002; Geneva, CH; (Joint Video Team of ISC/IEC JTC1/SC29/WG11 and ITU-T SG16), No. JVT-E076, Oct. 18, 2002, all pages.
Li (USTC) B et al.: "High-level Syntax: Marking process for non-TMVP pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: HTTP://WFTP3.ITU.INT/AV-ARCH/JCTVC-SITE/,, No. JCTV-G398, Nov. 8, 2011, all pages.
Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL:HTTP://WFTP3.ITU.INT/AV-ARCH/JCTVC-SITE/,, No. JCTVC-D139, Jan. 15, 2011, all pages.
Li et al.,"Redundancy reduction in B-Frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.
Lim C S et al.: "High-level Syntax: Proposed fix on signalling of TMVP disabling flag", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,, No. JCTVC-I0420, Apr. 17, 2012, all pages.
Bordes et al.: "AHG9: Simplification of weighted prediction signaling in PPS," 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG16); URL: http://wftp3.itu.int/av-arch/jctvc-site/. No. JCTVC-J0504, Jul. 12, 2012, all pages.
Suzuki et al., "Extension of uni-prediction simplification in B slices" Joint Collaborative Team on Video Coding (JCTVC) of ITU-T SG16 WP3 and ISO/IEC JTC1/SC29/WG11; 4th Meeting: Daegu. Lorea; JCTVC-D421 Jan. 20-28, 2011; 8 pages.
Toshiyasu Sugio et al.: CE9: Experiment A, I, J and S Modified derivation processof reference index for skip mode and temporal motion vector predictor 20110318, No. JCTVC-E230, Mar. 18, 2011.
Wahadaniah V et al.: "AHG14/AHG15/non-CE9: Loss robustness issue in TMVP disabling", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG. 16); URL: HTTP://WFTP3.ITU.INT/AV-ARCH/JCTVC-SITE/,, No. JCTVC-H0570, Jan. 21, 2012, all pages.
W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16) URL: HTTP://WFTP3.ITU.INT/AV-ARCH/JCTVC-SITE/,, No. JCTVC-G680, Nov. 9, 2011, all pages.
Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G334, Nov. 9, 2011, all pages.
Yue Yu et al.: "Implicit Signaling of collocated picture for HEVC", 99.MPEG Meeting; Feb. 6, 2012-Feb. 18, 2012; San Josa CR; (Motion Picture Expert Group or ISO/IEC JTCI/SC29/WG11), No. m23429, Jun. 7, 2012 XP030051954.
Yue Yu et al.: "Modification of slice temporal mvp enable flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-TSG. 16); URL:HTTP://WFTP3.ITU.INT/AV-ARCH/JCTVC-SITE/,, No. JCTVC-K0251, Oct. 2, 2012, all pages.
Yue Yu et al.: "Modifications on signalling collocated picture", 9. JCT-VC Meeting; 188. MPEG Meeting; Apr. 27, 2012-May 7, 2012; Geneva; (Joint Collaborative Team on Video Coding of ISO/IEC JTCI/SC29/WG11 and ITU-T SG.16);URL:http://wftp3.itu.int/av-arch/jctvc-site/, No. JCTVC-I0266. Apr. 17, 2012 XP030112029.
Yue Yu et al.: "The Reference Picture Construction of Combined List for HEVC",7. JCT-VC Meeting; 98. MPEG Meeting; Nov. 21, 2011-Nov. 30, 2011;Geneva;(Joint Collaborative Team on Video Coding of ISO/IEC JTC1/SC29/WG11 and ITU-T SG.16); URL:http://wftp3.itu.int/av-arch/jctvc-site/, No. JCT-G717, Nov. 10, 2011.
Yue Yuet al.: "Simplification of MVP Design for HEVC",6. JCT-VC Meeting; 97. MPEG Meeting; Jul. 14, 2011-Jul. 22, 2011; Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F575. Jul. 19, 2011 XP03009598.
European Office Action for EP128140860 mailed Oct. 20, 2015, 10 pages.
Bross B et al.: "High Efficiency Video (HEVC) text specification Working Draft 5", 7. JCT-VC Meeting; 98, MPEG Meeting; Nov. 21, 2011-Nov. 30, 2011; Geneva; (Joint Collaborative Team on Video Coding of ISO/IEC JTC1/SC29/WG11 and ITU-T SG. 16); URL:HTTP://WFTP3.ITU.INT/AV-ARCH/JCTVC-SITE/, No. JCTVC-G1103, Dec. 19, 2011, all pages.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Bin Li et al., "Redundancy Reduction in B-Frame Coding at Temporal Level Zero," JCTVC-C278, Oct. 7, 2010.
Ericsson, "Absolute signaling of reference pictures," JCTVC-F493 WG11 No. m20923, JCT-VC of ITU-T SG16 WP3 and ISO/IEC JTC1/SC29/WG11, 6th (JCTVCF493) Meeting: Torino (2011).
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Korean Office Action dated Aug. 12, 2015 in related matter. 11 pages.KR10-214-7013280.
Motorola Mobility, "The Construction of Combined List for HEVC," JCTVC-F573-r2, JCT-VC of ITU-T SG16 WP3 and ISO/IEC JTC1/SC29/WG11, 6th (JCTVCF573) Meeting: Torino, IT (Jul. 14-22, 2011).
Office Action in a related matter. Korean Patent Application No. 10-2014-7017195, mailed Jul. 30, 2015 citing new art.
Overview; VP7 Data Format and Decoder. Version 1.5. On2 Technologies, IxNC. Dated Mar. 28, 2005.
Samsung Electronics Co., Ltd., "Restriction on motion vector scaling for Merge and AMVP," JCTVC-G551, JCT-VC of ITU-T SG16 WP3 and ISO/IEC JTC1/SC29/WG11, 7th (JCTVCG551) Meeting: Geneva, CH (Nov. 21-30, 2011).
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.

(56) References Cited

OTHER PUBLICATIONS

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

* cited by examiner

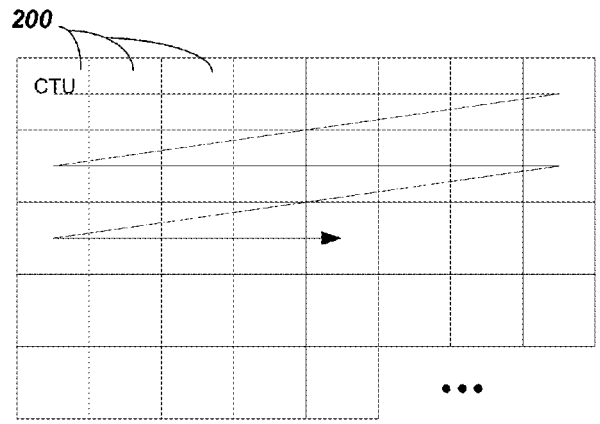
FIG. 2
*Prior Art*
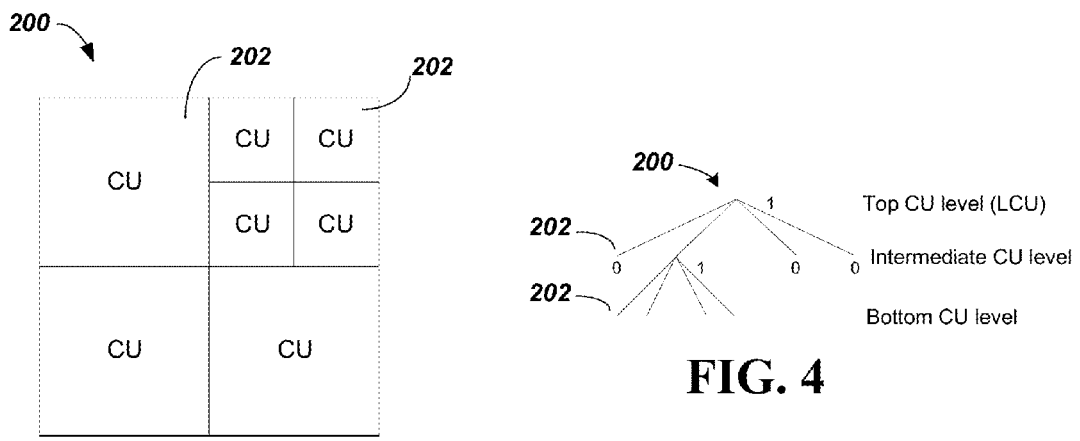
FIG. 3
*Prior Art*
FIG. 4
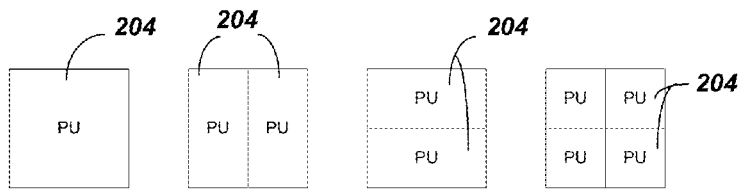
FIG. 5

Reference Picture Set Syntax

| ref_pic_set( idx ) { | Descriptor |
|---|---|
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| * if(NumRpsCurr0>1) | |
| *   collocated_picture_idx_list0 | u(v) |
| * if(NumRpsCurr1>1) | |
| *   collocated_picture_idx_list1 | u(v) |
| } | |

| | | |
|---|---|---|
| 1202 | if( slice_type == B ) | |
| | collocated_from_l0_flag | u(1) |
| 1204 | if( slice_type != I ) | |
| | { | u(1) |
| | if(collocated_from_l0_flag) | |
| | { | |
| 1206 | if(num_ref_idx_l0_active_minus1 > 0) | |
| | collocated_picture_idx | ue(v) |
| | } | |
| | else | |
| | { | |
| 1208 | if(num_ref_idx_l1_active_minus1>0) | |
| | collocated_picture_idx | ue(v) |
| | } | |
| | } | |

FIG. 12A

EXPLICIT WAY FOR SIGNALING A COLLOCATED REFERENCE PICTURE FOR VIDEO CODING

CROSS REFERENCE TO RELATED APPLICATIONS

This Application claims priority under 35 U.S.C. §119(e) from earlier filed U.S. Provisional Application Ser. No. 61/595,061, filed Feb. 4, 2012, and is a continuation in part of U.S. patent application Ser. No. 13/680,531, filed Nov. 19, 2012; U.S. patent application Ser. No. 13/681,237, filed Nov. 19, 2012; and U.S. patent application Ser. No. 13/681,254, filed Nov. 19, 2012, all of which claim priority to earlier filed United States Provisional Application Ser. No. 61/561,270, filed Nov. 19, 2011, all of which are incorporated herein by reference.

BACKGROUND

1. Technical Field

The present disclosure relates to the field of video compression, particularly video compression using High Efficiency Video Coding (HEVC) that employ block processing.

2. Related Art

FIG. 1 depicts a content distribution system 100 comprising a coding system 110 and a decoding system 140 that can be used to transmit and receive HEVC data. In some embodiments, the coding system 110 can comprise an input interface 130, a controller 111, a counter 112, a frame memory 113, an encoding unit 114, a transmitter buffer 115 and an output interface 135. The decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random access memory and a read only memory.

Source pictures 120 supplied from, by way of a non-limiting example, a content provider can include a video sequence of frames including source pictures in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding units can be derived from the source pictures utilizing the controller 111. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the Coding Units based on a source picture. In response to the encoding control signal 124 from the controller 111, the encoding unit 114 can begin to read out the prepared Coding Units to a high-efficiency encoding process, such as a prediction coding process or a transform coding process which process the prepared Coding Units generating video compression data based on the source pictures associated with the Coding Units.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitter buffer 115 so the counter 112 can be incremented or decremented. The controller 111 can control the production of video packets produced by the encoding unit 114 on the basis of the occupied area information 126 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

In various embodiments, the coding system 110 can be incorporated or otherwise associated with a transcoder or an encoding apparatus at a headend and the decoding system 140 can be incorporated or otherwise associated with a downstream device, such as a mobile device, a set top box or a transcoder.

The coding system 110 and decoding system 140 can be utilized separately or together to encode and decode video data according to various coding formats, including High Efficiency Video Coding (HEVC). HEVC is a block based hybrid spatial and temporal predictive coding scheme. In HEVC, input images, such as video frames, can be divided into square blocks called Coding Tree Units (CTUs) 200, as shown in FIG. 2. CTUs 200 can each be as large as 128×128 pixels, unlike other coding schemes that break input images into macroblocks of 16×16 pixels. As shown in FIG. 3, each CTU 200 can be partitioned by splitting the CTU 200 into four Coding Units (CUs) 202. CUs 202 can be square blocks each a quarter size of the CTU 200. Each CU 202 can be further split into four smaller CUs 202 each a quarter size of the larger CU 202. By way of a non-limiting example, the CU 202 in the upper right corner of the CTU 200 depicted in FIG. 3 can be divided into four smaller CUs 202. In some embodiments, these smaller CUs 202 can be further split into even smaller sized quarters, and this process of splitting CUs 202 into smaller CUs 202 can be completed multiple times.

BRIEF DESCRIPTION OF THE DRAWINGS

Further details of particular embodiments are explained with the help of the attached drawings in which:

FIG. 2 depicts an embodiment of an input image divided into Coding Tree Units;

FIG. 3 depicts an embodiment of a Coding Tree Unit divided into Coding Units;

FIG. 4 depicts a quadtree representation of a Coding Tree Unit divided into Coding Units;

FIG. 5 depicts possible exemplary arrangements of Prediction Units within a Coding Unit;

FIG. 12A provides a syntax listing illustrating another embodiment for identifying a collocated reference picture for use in decoding a current picture using a common reference picture list;

DETAILED DESCRIPTION

Figure 1:
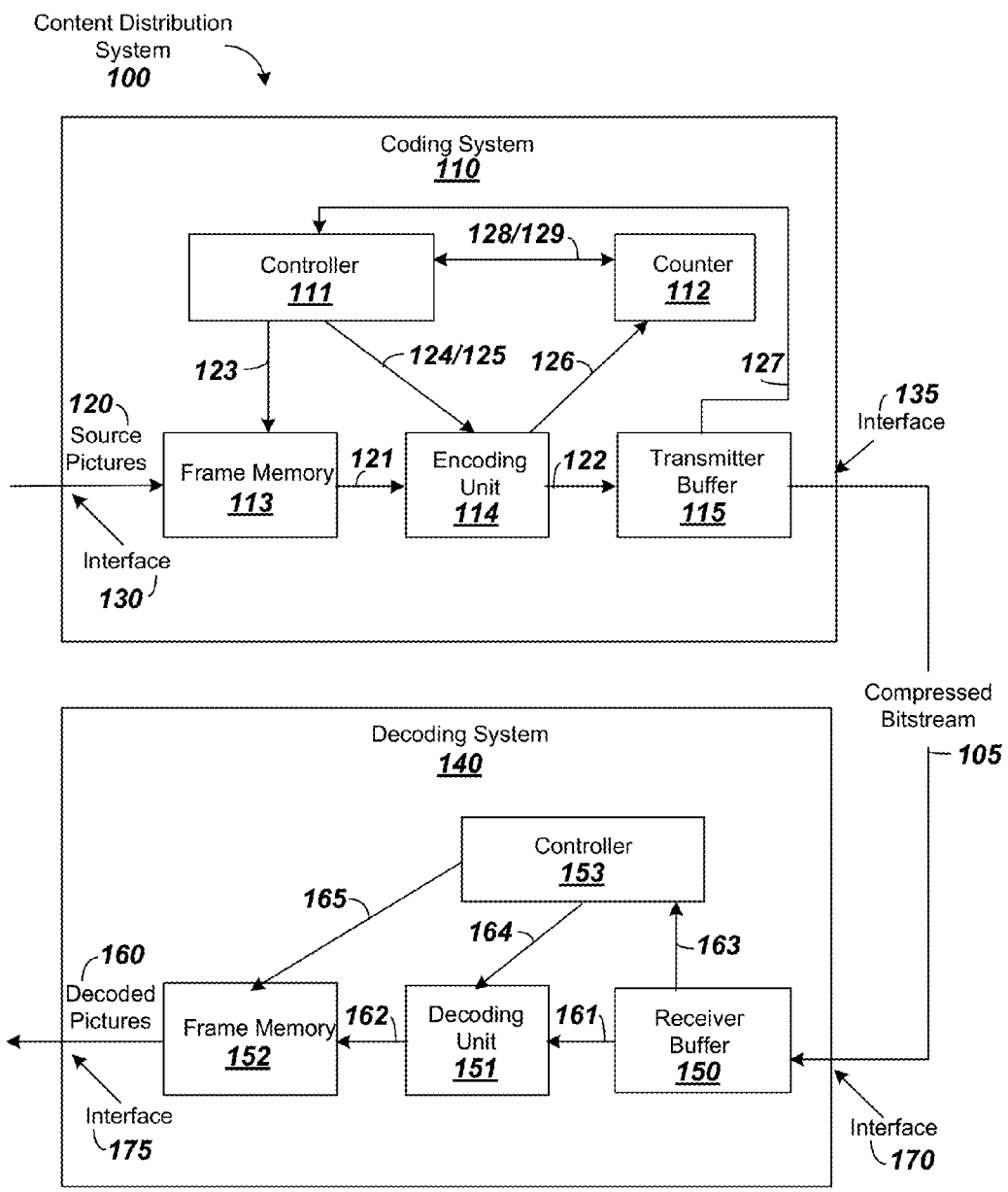
FIG. 1 depicts an embodiment of a content distribution system.

In one embodiment, a method for use in encoding and decoding a group of pictures in a video stream is provided. The method identifies a current picture in the group of pictures for encoding or decoding and determines a slice type for the current picture. When the slice type for the current picture is not equal to an I-type, the method identifies a collocated reference picture in the group of pictures using a syntax to determine if a collocated reference picture index should be accessed to identify the collocated reference picture and uses the collocated reference picture to encode or decode the current picture.

In one embodiment, a decoder is provided for processing a coded video stream that contains a group of pictures, the decoder comprising: a processor; a memory, communicatively coupled to the processor, the memory storing a plurality of instructions comprising instructions cause the processor to: determine a current picture in the group of pictures for decoding; determine a slice type for the current picture; when the slice type for the current picture is not equal to an I-type, performing: determine a collocated reference picture in the group of pictures using a syntax; and use the collocated reference picture to decode the current picture.

In one embodiment, an encoder is provided for encoding a video stream containing a group of pictures, the encoder comprising: a processor; a memory, communicatively coupled to the processor, the memory storing a plurality of instructions comprising instructions that cause the processor to: identify a current picture in the group of pictures for encoding; determine a slice type for the current picture; when the slice type for the current picture is not equal to an I-type, performing: identify a collocated reference picture in the group of pictures using a syntax; and use the collocated reference picture to encode the current picture.

In one embodiment, a method is provided for use in encoding and decoding a group of pictures in a video stream comprising: identifying a current picture in the group of pictures for encoding or decoding; determining a slice type for the current picture; when the slice type for the current picture is not equal to an I-type, performing: determining a state of a flag; when the flag is in a first state, determining a value for a collocated reference picture in a first list; when the flag is in a second state, determining a value for the collocated reference picture in a second list; and using the collocated reference picture to encode or decode the current picture.

In HEVC, an input image, such as a video frame, is broken up into CUs that are then identified in code. Although HEVC is described, other video compression standards may also be appreciated. The CUs are then further broken into sub-units that are coded as will be described subsequently.

Initially for the coding a quadtree data representation can be used to describe the partition of a CTU 200 in FIG. 2. The quadtree representation can have nodes corresponding to the CTU 200 and CUs 202. At each node of the quadtree representation, a flag "1" can be assigned if the CTU 200 or CU 202 is split into four CUs 202. If the node is not split into CUs 202, a flag "0" can be assigned. By way of a non-limiting example, the quadtree representation shown in FIG. 4 can describe the CTU partition shown in FIG. 3, in which the CTU 200 is split into four CUs 202, and the second CU 202 is split into four smaller CUs 202. The binary data representation of the quadtree can be a CU split flag that can be coded and transmitted as overhead, along with other data such as a skip mode flag, merge mode flag, and the PU coding mode described subsequently. By way of a non-limiting example, the CU split flag quadtree representation shown in FIG. 4 can be coded as the binary data representation "10100."

At each leaf of the quadtree, the final CUs 202 can be broken up into one or more blocks called prediction units (PUs) 204. PUs 204 can be square or rectangular. A CU 202 with dimensions of 2N×2N can have one of the four exemplary arrangements of PUs 204 shown in FIG. 5, with PUs 204 having dimensions of 2N×2N, 2N×N, N×2N, or N×N.

A PU can be obtained through spatial or temporal prediction. Temporal prediction is related to inter mode pictures. Spatial prediction relates to intra mode pictures. The PUs 204 of each CU 202 can, thus, be coded in either intra mode or inter mode. Features of coding relating to intra mode and inter mode pictures is described in the paragraphs to follow.

Intra mode coding can use data from the current input image, without referring to other images, to code an I picture. In intra mode the PUs 204 can be spatially predictive coded. Each PU 204 of a CU 202 can have its own spatial prediction direction. Spatial prediction directions can be horizontal, vertical, 45-degree diagonal, 135 degree diagonal, DC, planar, or any other direction. The spatial prediction direction for the PU 204 can be coded as a syntax element. In some embodiments, brightness information (Luma) and color information (Chroma) for the PU 204 can be predicted separately. In the HEVC, the number of Luma intra prediction modes for all block size is 35. In alternate embodiments, the number of Luma intra prediction modes for blocks of any size can be 35. An additional mode can be used for the Chroma intra prediction mode. In some embodiments, the Chroma prediction mode can be called "IntraFromLuma."

Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU 204 over the associated reference images. The best match prediction can be described by the motion vectors and associated reference images. P pictures use data from the current input image and one or more reference images, and can have up to one motion vector. B pictures may use data from the current input image and one or more reference images, and can have up to two motion vectors. The motion vectors and reference pictures can be coded in the encoded bitstream. In some embodiments, the motion vectors can be syntax elements "MV," and the reference pictures can be syntax elements "refIdx." In some embodiments, inter mode can allow both spatial and temporal predictive coding.

Figure 6A:
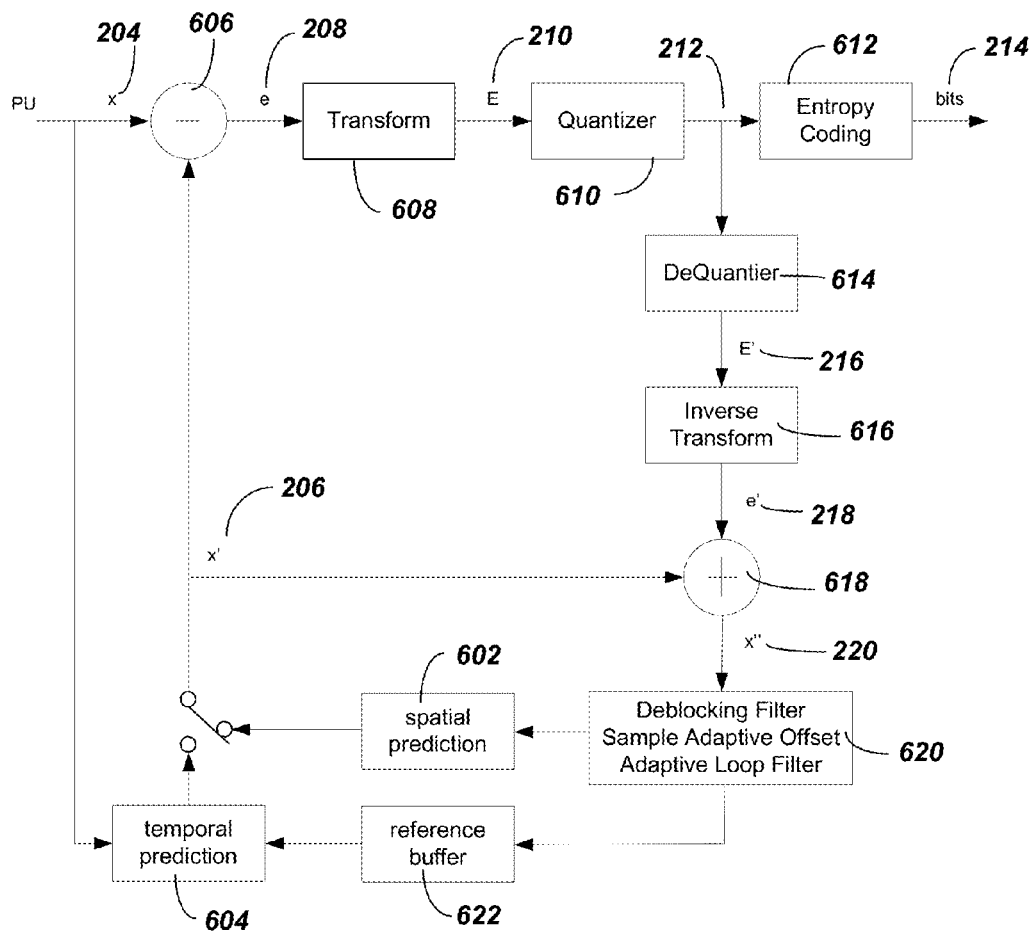
FIG. 6A depicts a block diagram of an embodiment of a method for encoding and/or decoding a Prediction Unit.

FIG. 6A depicts a block diagram of an encoder that can encode or decode a PU 204, x. At 606 a predicted PU 206, x', that is predicted by intra mode at 602 or inter mode at 604, as described above, can be subtracted from the current PU 204, x, to obtain a residual PU 208, e. At 608 the residual PU 208, e, can be transformed with a block transform into one or more transform units (TUs) 210, E. Each TU 210 can comprise one or more transform coefficients 212. In some embodiments, the block transform can be square. In alternate embodiments, the block transform can be non-square.

Figure 7:
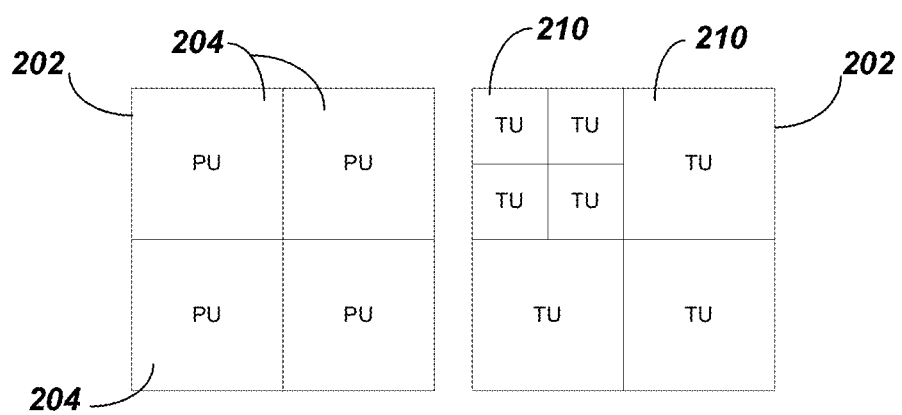
FIG. 7 depicts an exemplary embodiment of a Coding Unit divided into Prediction Units and Transform Units.
Figure 8:
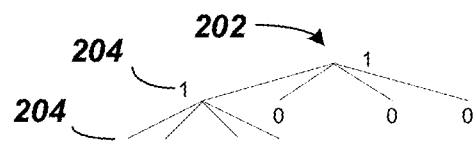
FIG. 8 depicts an exemplary embodiment of a quadtree representation of a Coding Unit divided into Transform Units.

As shown in FIG. 7, in HEVC, a set of block transforms of different sizes can be performed on a CU 202, such that some PUs 204 can be divided into smaller TUs 210 and other PUs 204 can have TUs 210 the same size as the PU 204. Division of CUs 202 and PUs 204 into TUs 210 can be shown by a quadtree representation. By way of a non-limiting example, the quadtree representation shown in FIG. 8 depicts the arrangement of TUs 210 within the CU 202 shown in FIG. 7.

Referring back to FIG. 6A, at 610 the transform coefficients 212 of the TU 210, E, can be quantized into one of a finite number of possible values. In some embodiments, this is a lossy operation in which data lost by quantization may not be recoverable. After the transform coefficients 212 have been quantized, at 612 the quantized transform coefficients 212 can be entropy coded to obtain the final compression bits 214. Entropy coding schemes that can be applied during step 612 can include context-based adaptive binary arithmetic coding (CABAC) and context-adaptive variable-length coding CAVLC.

At 614 the quantized transform coefficients 212 can be dequantized into dequantized transform coefficients 216 E'. At 616 the dequantized transform coefficients 216 E' can then be inverse transformed to reconstruct the residual PU 218, e'. At 618 the reconstructed residual PU 218, e', can then be added to a corresponding prediction PU 206, x', obtained through either spatial prediction at 602 or temporal prediction at 604, to obtain a reconstructed PU 220, x". Particular embodiments may be used in determining the prediction, such temporal prediction 604 is used in the prediction process to determine the collocated picture to use. At 620, a deblocking filter can be used on reconstructed PUs 220, x", to reduce blocking artifacts. Also, at 620, a sample adaptive offset process is provided that can be conditionally performed to compensate the pixel value offset between reconstructed pixels and original pixels. Further, at 620, an adaptive loop filter can be conditionally used on the reconstructed PUs 220, x", to reduce or minimize coding distortion between input and output images.

If the reconstructed image is a reference image that may be used for future temporal prediction in inter mode coding, the reconstructed images can be stored in a reference buffer 622. Intra mode coded images can be a possible point where decoding can begin without needing additional reconstructed images.

Figure 6B:
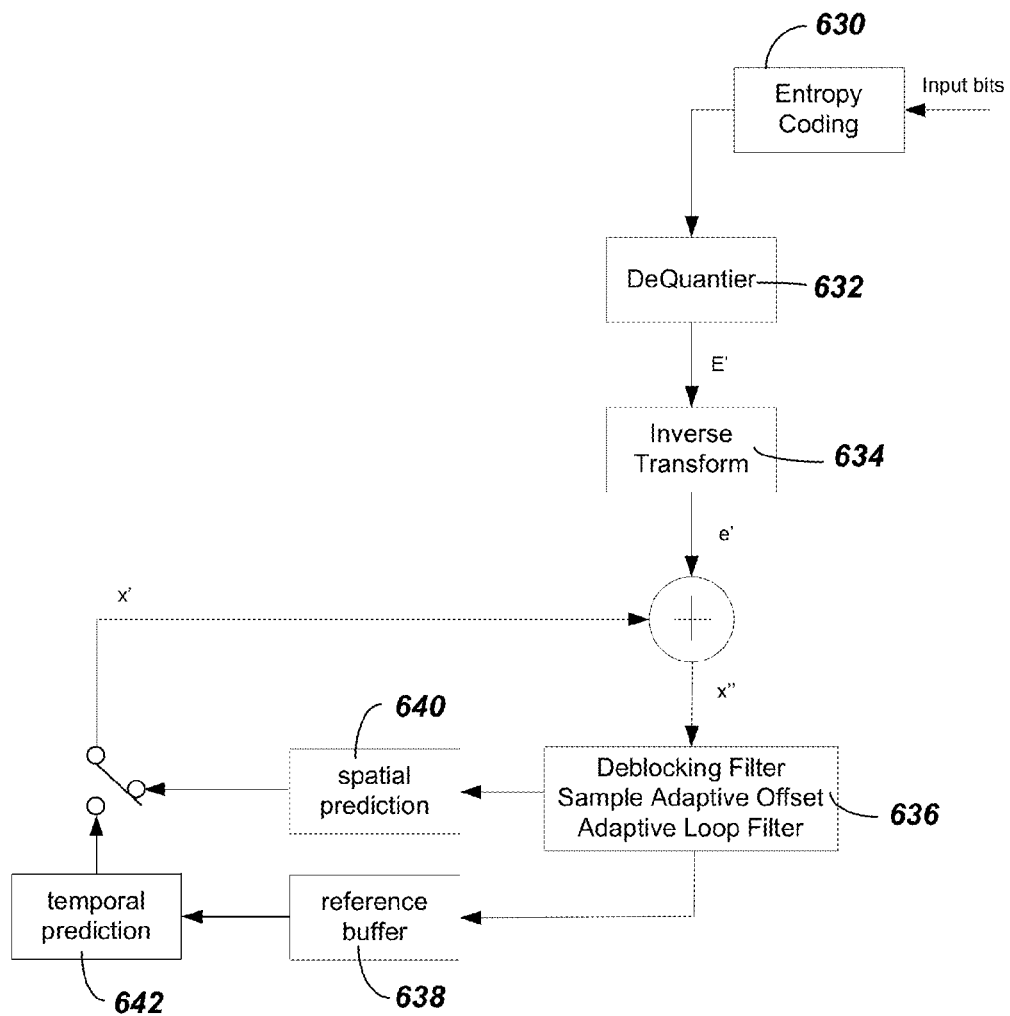
FIG. 6B depicts an example of a decoder according to one embodiment.

FIG. 6B depicts an example of a decoder according to one embodiment. A general operation of the decoder will now be described; however, it will be understood that variations on the decoding process described will be appreciated by a person skilled in the art based on the disclosure and teachings herein. The decoder receives input bits from the encoder for encoded video content.

An entropy decoding block 630 performs entropy decoding on the input bitstream to generate quantized transform coefficients of a residual PU. A de-quantizer 632 de-quantizes the quantized transform coefficients of the residual PU. De-quantizer 632 then outputs the de-quantized transform coefficients of the residual PU, E'. An inverse transform block 634 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 636 performs de-blocking on the reconstructed PU, x", to reduce blocking artifacts. Additionally, loop filter 636 may perform a sample adaptive offset process after the completion of the de-blocking filter process for the decoded picture, which compensates for a pixel value offset between reconstructed pixels and original pixels. Also, loop filter 636 may perform adaptive loop filtering over the reconstructed PU, which minimizes coding distortion between the input and output pictures. Additionally, if the reconstructed pictures are reference pictures, the reference pictures are stored in a reference buffer 638 for future temporal prediction.

The prediction PU, x', is obtained through either spatial prediction or temporal prediction. A spatial prediction block 640 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 642 performs temporal prediction through a motion estimation operation. Particular embodiments may be used in determining the prediction, such temporal prediction block 642 is used in the prediction process to determine the collocated picture to use. A decoded motion vector is used to determine the prediction PU, x'. Interpolation may be used in the motion estimation operation.

Particular embodiments provide advancements in the identification of reference pictures to assist in encoding and decoding of a current picture. In particular, if the current picture is part of slice that is not an I-type, identification of collocated reference picture is provided to enable more efficient encoding and decoding of the associated current picture. The motion vector from collocated reference picture can be used as one of the candidates for Advanced Motion Vector Picture (AMVP) and merge/skip mode for a block in the current picture. Information about how collocated reference pictures are identified for current pictures is described for embodiments to follow.

I. Overview—The Collocated Reference Picture Identification

In one example, an associated collocated reference picture for a current picture can reside in a preceding or subsequent picture that is being decoded or encoded. The motion vector from the collocated reference picture can be used as a candidate to enable AMVP and merge/skip mode for the current picture.

The collocated reference picture provides a reference picture and in one method for identifying the collocated reference picture when B type pictures are used, the collocated reference picture can be specified in one of two lists, referred to as list0 or list1. A flag labeled collocated_from_l0_flag can be used to designate which one of the two lists, list0 or list1, includes the collocated reference picture. The flag can be set to 1 to indicate that the picture shall be derived from list0, otherwise the picture shall be derived from list1. The default value of collocated_from_l0_flag is 1 if it is not present in the bitstream containing the group of pictures for encoding or decoding.

Specifically, the steps that can be used in a more conventional method to identify a collocated reference picture are provided below. In the steps, the flag collocated_from_l0_flag, as identified above, is used along with variables identifying list0 and list1, labeled RefPicList0[ ] and RefPicList1[ ]. An additional variable, colPic, identifies the collocated reference picture. The two steps (A) and (B) for the procedure are as follows:

(A) If slice_type is equal to B and collocated_from_l0_flag is equal to 0, the variable colPic specifies the picture that contains the co-located partition as specified by RefPicList1[0] which means that the first entry in the list1 is treated as collocated reference picture.

(B) Otherwise when the slice_type is equal to B and collocated_from_l0_flag is equal to 1 or slice_type is equal to P, the variable colPic specifies the picture that contains the co-located partition as specified by RefPicList0[0] which means that the first entry in the list0 is treated as collocated reference picture.

The collocated reference picture is identified using this first "implicit" method as a first reference picture in either list0 or list1, depending upon the value of the flag, collocated_from_l0_flag. However, this implicit method for defining a collocated reference picture may not be optimal. Ideally, the collocated reference picture should be the closest reference picture to the current picture. But, the first reference picture in list0 or list1 may not necessarily be the one closest to the current picture. Moreover, RefPicList0[0] or RefPicList1[0] for different slices within a same picture may not point to a same collocated reference picture, which will complicate a hardware implementation of an encoder or decoder. Thus, it may be useful to provide alternative ways of signaling the collocated reference picture.

II. Improved Explicit Collocated Reference Picture Identification

In order to have the flexibility to choose an optimal collocated reference picture, the collocated reference picture can be signaled explicitly, instead of implicitly. For explicit signaling, when a current picture is included in a slice that is not an I-type slice, a syntax element is used to explicitly represent the collocated reference picture by using procedures including embodiments that may not use the first entry reference picture in list0 or list1, or alternatively references a picture to identify the collocated reference picture from a single list instead of two separate lists. Depending upon where the new syntax element is put to explicitly represent the collocated reference picture, one or two syntax elements may be needed for list0 and list1 or a single list that effectively removes the need to reference both list0 and list1 might alternatively be used in more efficient coding. Additionally, when the current slice is an I-type, the syntax element to explicitly represent the collocated reference picture may be not transmitted in the encoded bitstream.

A. Explicit Syntax Using List0 and List1

In one embodiment method of explicitly identifying the collocated reference picture, an absolute picture order count (POC) difference is used to represent the reference picture. This method is implemented by using the POC and the difference between the current picture POC and a reference picture POC. The POC and delta POC are used to construct a reference picture set (RPS). The RPS is then used to create two lists list0 and list1 that identify a collocated reference picture that can be used to encode and decode a current picture. The method of this embodiment to identify a collocated reference picture can be performed using the syntax of FIG. 9.

Figures 9, 10:
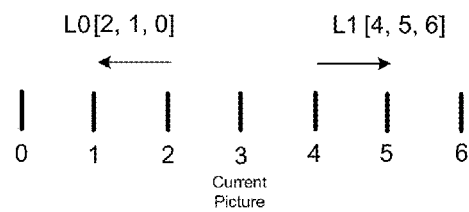
FIG. 9 provides a syntax listing illustrating one embodiment for identifying a collocated reference picture for use in decoding a current picture using two reference picture lists, list0 and list1.
FIG. 10 illustrates a group of pictures for an explanation of how the difference in picture order count between a current picture and a reference picture is determined.

FIG. 9 begins by identifying a reference picture set index, ref_pic_set(idx), and identifying a number of negative and positive pictures for this reference picture set. The syntax variables for identifying the number of negative and positive variables, which are identical with the number of pictures in the list0 and list1, are num_negative_pics and num_pos_pics. The negative and positive pictures help to determine the pictures in list0 and list1 as can be explained with reference to FIG. 10. FIG. 10 illustrates a current picture 3 in a group of seven pictures with picture order count (POC) for the pictures ranging from 0 to 6. The negative pictures, or pictures that precede the current picture 3 include pictures 0-2. The positive pictures, or pictures that succeed the current picture 3 include pictures 4-6. As shown above the picture indicators, the negative pictures in list0 are represented as L0[2, 1, 0] in order after the current picture 3 where those numbers in the bracket are POC numbers of reference pictures in the list0 and, for example, the first entry of list0 is POC 2 and the second entry of list0 is POC 1 and so on. Similarly, the positive pictures in list1 are represented as L1[4, 5, 6] in order after the current picture 3. Keep in mind that pictures with POC 0, 1, 2, 4, 5 and 6 are encoded or decoded before picture 3.

The syntax of FIG. 9 continues by determining the difference between the current picture and a reference picture in the POC. This enables the list values for L0 and L1, shown in FIG. 10, to be converted to a more reasonable value by using difference coding. For example, with the syntax steps:

for(I=0; I<num_negative_pics; i++)
delta_poc_s0_minus1[i]
used_by_current_pic_s0_flag[i].

These steps subtract the listed pictures from the current picture in the POC to convert list L0[2, 1, 0] to a new delta POC list L0[1, 2, 3] so that it is more easy to code delta POC instead of POC themselves. In the meantime, a further step sets a current picture by using the used_by_current_pic_s0_flag to indicate whether the picture in the reference list0 is used or not. Similarly, with the syntax steps:

for(I=0; I<num_positive_pics; i++)
delta_poc_s1_minus1[i]
used_by_current_pic_s1_flag[i].

These steps subtract the listed pictures from the current picture in POC to covert list L1[4, 5, 6] to a new delta POC list L1[-1, -2, -3], and set a current picture by using used_by_current_pic_s1_flag to indicate whether the picture in the reference list1 is used or not.

FIG. 9 further includes significant syntax labeled with a "*". In this syntax, two variables are provided for the indexes for list0 and list1 in the reference picture set, ref_pic_set(idx), these variables being labeled collocated_picture_idx_list0 and collocated_picture_idx_list1, which specify the index for collocated reference picture in the list0 and list1, respectively. Further in this significant syntax, two variables for the number of current reference picture sets are provided labeled NumRpsCurr0, and NumRpsCurr1, that are also known as numbers of pictures for list0 and list1, respectively. The variables NumRpsCurr0 and NumRpsCurr1 identify the number of entries in the current reference picture sets, RefPicSetCurr0 and RefPicSetCurr1, respectively.

With this significant syntax in FIG. 9, the collocated reference picture is signaled explicitly in one of list0 and list1 by the collocated_picture_idx_list0 and collocated_picture_idx_ list1, respectively. First in the significant syntax, the number of pictures in the current reference picture set for list0, NumRpsCurr0, is checked to determine if it is greater than 1. If NumRpsCurr0 is zero, nothing is in list0, and if NumRpsCurr0 is one, the one reference picture listed in the list0 has to be the collocated reference picture. If however, NumRpsCurr0 is greater than one, then the syntax, collocated_picture_idx_list0, is reviewed to determine which reference picture is designated as a collocated reference picture. If collocated_picture_idx_list0 is not present, it is inferred to be equal to 0.

Second in the significant syntax of FIG. 9, the number of pictures in the current reference picture set for list1, NumRpsCurr1, is checked to determine if it is greater than 1. If NumRpsCurr1 is zero, nothing is in list1, and if NumRps Curr1 is one, the one reference picture listed in the list1 has to be the collocated reference picture. If however, NumRpsCurr1 is greater than one, then the syntax, collocated_picture_idx_list1, is reviewed to determine which reference picture is designated as the collocated reference picture. If collocated_picture_idx_list1 is not present, it is inferred to be equal to 0.

Although not shown in the syntax of FIG. 9, a separate flag can be provided to identify which of the two listings, list0 or list1, identifies the collocated reference picture. The variable for the flag, collocated_from_l0_flag, may have two states, 1 or 0. If the collocated_from_l0_flag is equal to 1, the reference picture in list0 indicated by the collocated_picture_idx_list0 will be used for the collocated reference picture, otherwise, the reference picture in list1 indicated by the collocated_picture_idx_list1 will be used as the collocated reference picture.

For a slice/picture type other than B-type, the collocated_from_l0_flag may not be present and the decoder may be set to 1 as a default value to indicate that list0 will be used by default. For B slice pictures, the collocated_from_l0_flag can have either a 0 or 1 value to indicate which of list0 or list1 will be used. For I slice pictures, the syntax collocated_picture_idx_list0 and collocated_picture_idx_list1 may not be used because Intra pictures do not use temporal prediction.

In practice, the method shown by the syntax of FIG. 9 may be implemented to select a picture from a set of pictures as a collocated reference picture for a current picture. Several examples are provided to follow.

In a first example using the syntax of FIG. 9, collocated_from_l0_flag is 1 and NumRpsCurr0 is 5. The delta POCs of reference pictures in the reference picture set, labeled RefPicSetCurr0, are {2, 5, 1, 4, 3}. If collocated_picture_idx_list0 is 2, the reference picture with delta POC as 1 from list0 will be used as the collocated reference picture for the current picture/slice.

In a second example, collocated_from_l0_flag is 0 and NumRpsCurr1 is 5. The delta POC of reference pictures in the RefPicSetCurr1 are {3, 1, 2, 4, 5}. If collocated_picture_idx_ list1 is 1, the reference picture with delta POC as 1 from list1 will be used as the collocated reference picture for the current picture/slice.

Figure 11:
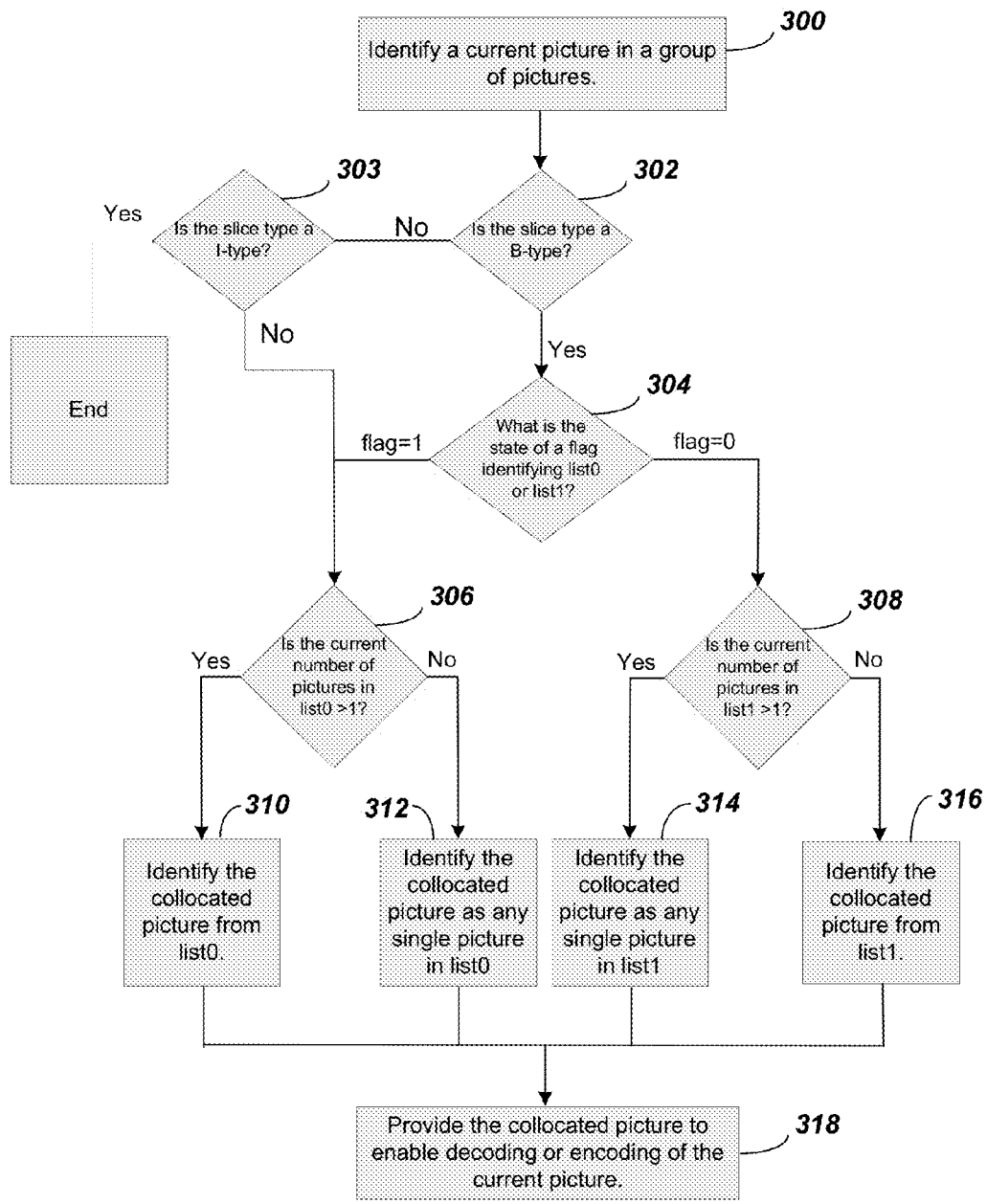
FIG. 11 provides a flow chart illustrating a compilation syntax steps that can be used to identify a collocated reference picture to enable decoding and encoding of a current picture.

FIG. 11 provides a flow chart illustrating a compilation of syntax steps that can be used to identify a collocated reference picture to enable decoding and encoding of a current picture. First, in step 300 a current picture in a group of pictures identified for encoding or decoding is provided. In step 302, the slice type of the current picture is identified to determine if it is a B-type. If so a flag must be accessed in step 304 to determine if the collocated reference picture is identified in list0 or list1. If the determining step 304 is used, the flag state determines if the method proceeds to step 306 to examine list0 for the collocated reference picture, or if it proceeds to step 308 to examine list1. If the picture is other than a B-type, such as a P-type, the method proceeds directly to step 306 and assumes the listing with the collocated reference picture is list0. At 303, if the picture is other than a B-type and a P-type, such as a I-type, the method then ends as an I-type picture does not need any syntax sent for identifying the collocated reference picture.

If list0 is to be examined, step 306 looks to see if the current number of pictures in the list0 is greater than 1. If so, control proceeds to step 310 to identify the collocated reference picture from list0. If in step 306 the number of pictures is equal to one, the process proceeds to step 312 to identify the collocated reference picture as the only picture in list0.

If list1 is to be examined, step 308 looks to see if the current number of pictures in the list1 is greater than 1. If so, control proceeds to step 314 to identify the collocated reference picture from list1. If in step 308 the number of pictures is equal to one, the process proceeds to step 316 to identify the collocated reference picture as the only picture in list1.

Finally, once the collocated reference picture is identified, the method proceeds to step 318. Step 318 provides the collocated reference picture to enable encoding or decoding the current picture.

B. Explicit Syntax Using a Single Reference List

As an alternative to the process shown by the syntax of FIG. 9, one can use a syntax, collocated_picture_idx, which specifies the index for collocated reference picture at either list0 or list1, at the slice header to explicitly signal the collocated reference picture for a current slice, as shown in the syntax listing of FIG. 12A. This way also uses collocated_from_l0_flag to determine which of list0 or list1 is to be used prior to accessing the reference picture list. However, the syntax collocated_picture_idx may be put after collocated_from_l0_flag. With this ordering, there will be no need to have two syntaxes. The syntax of FIG. 12A, thus, may provide a more efficient system than that of FIG. 9.

For the syntax of FIG. 12A, initially the slice type is identified with syntax variable slice_type. At 1202, it is determined if the slice type is B. If the slice type is B, then the flag, collocated_from_l0_flag is used and encoded in the bitstream. The flag collocated_from_l0_flag is set based on if the collocated reference picture will come from list0 or list1. For other slice types (e.g., I-types and P-types), the collocated_from_l0_flag may not be present and the value of collocated_from_l0_flag is inferred to be equal to 1, which means that the collocated reference picture always comes from list0 Thus, the above syntax checks whether the collocated_from_l0_flag should be set to a value.

At 1204, after checking whether the slice type is a B-type, then it is checked whether the slice type is not equal to an I-type. That is, the slice type is not equal to a B-type or a P-type. If this check was not included, then the following process would be performed even if the slice type was an I-type. That is, the variable collocated_picture_idx would be set to a value even though an I-type slice does not use a collocated reference picture. Still using the collocated_picture_idx variable and encoding the collocated_picture_idx variable in the bitstream would increase overhead. Thus, if the slice type is an I-type, then the collocated_picture_idx variable is not included in the encoded bitstream.

Unlike the embodiment of FIG. 9, in FIG. 12A a single collocated_picture_idx is consulted that can identify the collocated reference picture. The flag collocated_from_l0_flag can be set to 1 to indicate that the picture that contains a collocated partition shall be derived from the "if" syntax that examines pictures by using collocated_picture_idx from list0, otherwise the collocated reference picture shall be derived after the "else" statement from list1.

Similar to the embodiment of FIG. 9, in FIG. 12A two variables for the number of current reference picture sets are provided labeled Num_ref_idx_l0_active_minus1, and Num_ref_idx_l1_active_minus1. The variables Num_ref_idx_l0_active_minus1 and Num_ref_idx_l1_active_minus1, or number of reference pictures in the list0 and list1 respectively, identify the number of entries in the current reference picture sets minus 1. Other variables may be used, such as NumRpsCurr0 and NumRpsCurr1, which identify the number of entries in the current reference picture sets without subtracting 1. However, in the syntax, at 1206, the Num_ref_idx_l0_active_minus1 is checked to determine if it is greater to zero (if NumRpsCurr0 and NumRpsCurr1 were used, the variables would be checked against 1). If this statement is not true, then there is one reference picture available in list0. Thus, the position of the reference picture in list0 may not need to be signaled or evaluated. However, in some embodiments, if there is only one reference picture available in list0, the variable collocated_picture_idx may be set to 0, which identifies the first and only reference picture in list0. In other embodiments, the variable collocated_picture_idx is not used and encoded in the bitstream. If the statement is true, this means that there is more than one reference picture available in list0. If there is more than one reference picture available, the variable collocated_picture_idx is set to a position of the reference picture that includes the collocated reference picture.

At 1208, if collocated_from_l0_flag is set to 0 (thus the else statement is evaluated), the variable Num_ref_idx_l1_active_minus1 is checked to determine if it is greater to zero. If this is not true, then there is one reference picture available in list1. Thus, the position of the reference picture in list1 does not need to be signaled or evaluated. However, in some embodiments, if there is only one reference picture available in list1, the variable collocated_picture_idx may be set to 0, which identifies the first and only reference picture in list0. In other embodiments, the variable collocated_picture_idx is not used and encoded in the bitstream. If the statement is true, this means that there is more than one reference picture available in list1. If there is more than one reference picture available in list1, the variable collocated_picture_idx is set to a position of the reference picture that includes the collocated reference picture in list1.

Figure 12B:
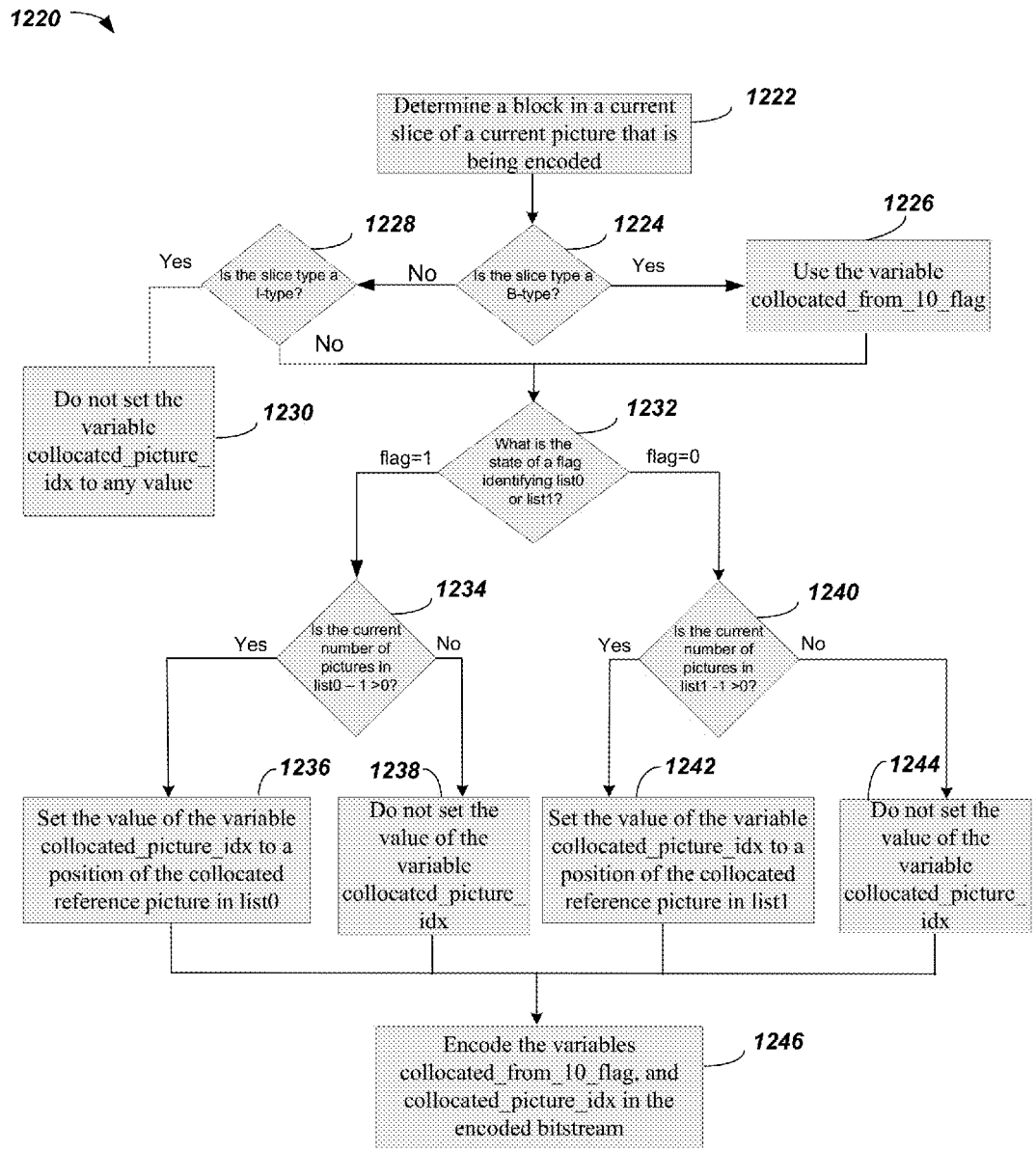
FIG. 12B depicts a simplified flowchart of a method for encoding video according to one embodiment.

FIG. 12B depicts a simplified flowchart 1220 of a method for encoding video according to one embodiment. At 1222, an encoder (e.g., as depicted in FIG. 6A) determines a block in a current slice of a current picture that is being encoded. The slice may be a group of blocks within the current picture. Also, the block may be a prediction unit (PU), but may also be other portions of the current picture or slice.

At 1224, the encoder determines if the slice type is a B-type for the current picture/current block. At 1226, if the slice type is equal to a B-type, then the variable collocated_from_l0_flag is used and encoder sets the value to a value of "0" or "1" depending on whether the collocated reference picture is found in list0 or list1, respectively. If the slice type is not equal to a B-type (i.e., the slice type is equal to an I-type or a P-type), then the encoder does not set the variable collocated_from_l0_flag to any value and it uses the default value, e.g. 1.

At 1228, the encoder determines if the slice type is not equal to an I-type (i.e., the slice type is equal to a B-type or a P-type). At 1230, if the slice type is equal to an I-type, then the encoder does not set the variable collocated_picture_idx to any value. The encoder then does not encode the variable collocated_from_l0_flag and the variable collocated_picture_idx in the encoded bitstream. This is because the pictures in the I slice will not use temporal prediction and signaling whether the list0 or list1 is to be used or a position in list0 or list1 for a collocated reference picture is not necessary.

At 1232, if the slice type is not equal to an I-type or the slice type was a B-type, then the encoder determines if the variable collocated_from_l0_flag indicates list0 contains the collocated reference picture (e.g., collocated_from_l0_flag=1). When collocated_from_l0_flag is equal to 1, then the collocated reference picture is found in list0. At 1234, if collocated_from_l0_flag is equal to 1, then the encoder determines if the variable Num_ref_idx_l0_active_minus1 is greater than zero. At 1236, if the variable Num_ref_idx_l0_active_minus1 is greater than zero, then, the encoder sets the value of the variable collocated_picture_idx to a position of the collocated reference picture in list0. When the value of the variable Num_ref_idx_l0_active_minus1 is greater than zero, this means there is more than one reference picture available in list0. The encoder determines which reference picture in list0 contains the collocated reference picture using various methods. The encoder then sets the variable collocated_picture_idx to the position of the collocated reference picture. At 1238, if the variable Num_ref_idx_l0_active_minus1 is not greater than zero, then, the encoder may not set the value of the variable collocated_picture_idx to a position of the collocated reference picture in list0. This is because there is only one reference picture in list0 and identifying the position is not necessary. In another embodiment, the encoder may set the variable collocated_picture_idx to a default value of 0.

At 1240, if collocated_from_l0_flag is equal to zero, then the encoder determines if the variable Num_ref_idx_l1_active_minus1 is greater than zero. When collocated_from_l0_flag is equal to zero, then the collocated reference picture is found in list1. At 1242, if the variable Num_ref_idx_l1_active_minus1 is greater than zero, then the encoder sets the value of the variable collocated_picture_idx to a position of the collocated reference picture in list1. When the value of the variable Num_ref_idx_l1_active_minus1 is greater than zero, this means there is more than one reference picture available in list1. The encoder determines which reference picture in list1 contains the collocated reference picture using various methods. The encoder then sets the variable collocated_picture_idx to the position of the collocated reference picture. At 1244, if the variable Num_ref_idx_l1_active_minus1 is not greater than zero, then, the encoder may not set the value of the variable collocated_picture_idx to a position of the collocated reference picture in list1. This because there is only one reference picture in list1 and identifying the position is not necessary. In another embodiment, the encoder may set the variable collocated_picture_idx to a default value of 0.

At 1246, the encoder then encodes the variables collocated_from_l0_flag, and collocated_picture_idx in the encoded bitstream.

Figure 12C:
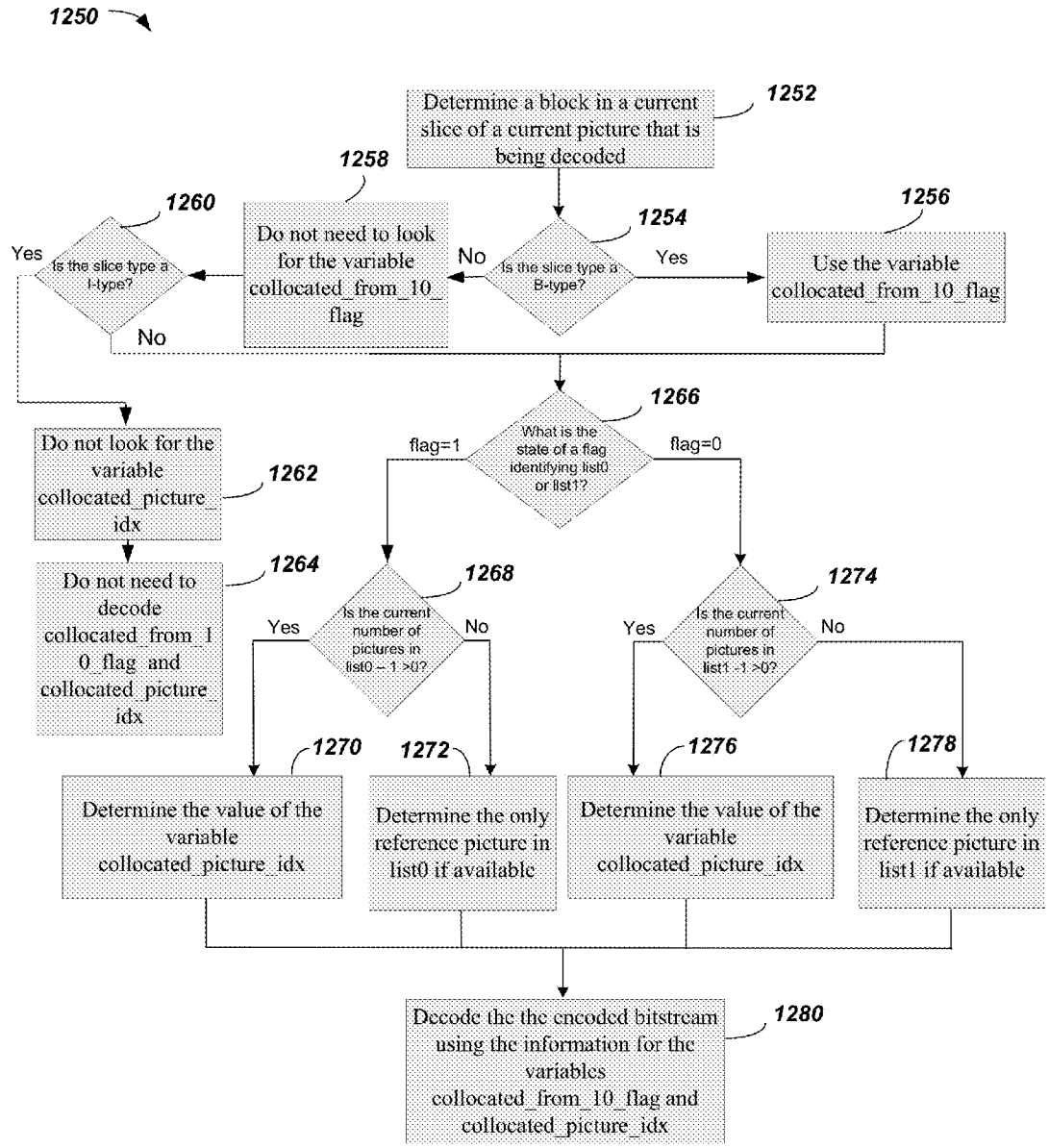
FIG. 12C depicts a simplified flowchart of a method for decoding video according to one embodiment.

FIG. 12C depicts a simplified flowchart 1250 of a method for decoding video according to one embodiment. At 1252, a decoder (e.g., as depicted in FIG. 6B) determines a block in a current slice of a current picture that is being decoded. The slice may be a group of blocks within the current picture. Also, the block may be a prediction unit (PU), but may also be other portions of the current picture or slice.

At 1254, the decoder determines if the slice type is a B-type for the current picture/current block. At 1256, if the slice type is equal to a B-type, then the variable collocated_from_l0_flag is used and decoder determines the value of collocated_from_l0_flag, which may be a value of "0" or "1" depending on whether the collocated reference picture is found in list0 or list1, respectively. At 1258, if the slice type is not equal to a B-type (i.e., the slice type is equal to an I-type or a P-type), then the decoder does not need to look for the variable collocated_from_l0_flag in the encoded bitstream. Rather, the decoder assumes the value for collocated_from_l0_flag is 1 (i.e., list0 contains the collocated reference picture if the current slice type is a P-type)

At 1260, the decoder determines if the slice type is not equal to an I-type (i.e., the slice type is equal to a B-type or a P-type). At 1262, if the slice type is equal to an I-type, then the decoder does not look for the variable collocated_picture_idx. This is because an I-type slice does not use temporal predication and thus the encoder may not have signaled a position in either list0 or list1 that contains a collocated reference picture. At 1264, the decoder then does not need to decode the variable collocated_from_l0_flag and the variable collocated_picture_idx in the encoded bitstream.

At 1266, if the slice type is not equal to an I-type, then the decoder determines if the variable collocated_from_l0_flag indicates list0 contains the collocated reference picture (e.g., collocated_from_l0_flag=1). When collocated_from_l0_flag is equal to 1, then the collocated reference picture is found in list0. At 1268, if collocated_from_l0_flag is equal to 1, then the decoder determines if the variable Num_ref_idx_l0_active_minus1 is greater than zero. At 1270, if the variable Num_ref_idx_l0_active_minus1 is greater than zero, then the decoder determines the value of the variable collocated_picture_idx, which indicates a position of the collocated reference picture in list0. When the value of the variable Num_ref_idx_l0_active_minus1 is greater than zero, this means there is more than one reference picture available in list0. Using the value of the variable collocated_picture_idx, the decoder now knows the collocated reference picture for the current block/current picture. At 1272, if the variable Num_ref_idx_l0_active_minus1 is not greater than zero, then the decoder can determine the only reference picture in list0 if available as the collocated reference picture.

At 1274, if collocated_from_l0_flag is equal to zero, then the decoder determines if the variable Num_ref_idx_l1_active_minus1 is greater than zero. When collocated_from_l0_flag is equal to zero, then the collocated reference picture is found in list1. At 1276, if the variable Num_ref_idx_l1_active_minus1 is greater than zero, then the decoder determines the value of the variable collocated_picture_idx, which indicates a position of the collocated reference picture in list1. When the value of the variable Num_ref_idx_l1_active_minus1 is greater than zero, this means there is more than one reference picture available in list1. Using the value of the variable collocated_picture_idx, the decoder then knows the collocated reference picture. At 1278, if the variable Num_ref_idx_l0_active_minus1 is not greater than zero, then the decoder can determine the only reference picture in list1 if available as the collocated reference picture.

At 1280, the decoder then decodes the encoded bitstream using the information for the variables collocated_from_l0_flag and collocated_picture_idx (if applicable).

C. Explicit Collocated Reference Picture with Efficient Syntax

The features common to both of the syntax for sections A and B above illustrate how an explicit method to identify a collocated reference picture can be performed. The syntax of section A uses may require more resources to identify the collocated reference picture. For example, searching through two separate lists, collocated_picture_idx_list0 and collocated_picture_idx_list1, must be performed to identify the collocated reference picture. By taking advance steps in the system of section B to eliminate a need to search through one of the lists by initially referencing a flag collocated_from_l0_flag, the syntax of section B eliminates resources required. Further, in Section B, the slice type is reviewed prior to even referencing the flag because if the slice type is I-type or P-type, and not B-type, the flag state will be known in advance.

Similar to the changes from syntax of section A to section B, other modifications of the syntax can be performed to make identification of the collocated reference picture more efficient. The common features of the syntax of sections A and B include: (1) identifying a current picture in a group of pictures for decoding or encoding; (2) if the current picture is part of slice that is not an I-type, (2a) providing syntax for identifying a collocated reference picture in the group of pictures; and (2b) using the identified collocated reference picture to decode or encode the current picture Coding and encoding with the proposed syntax of FIGS. 9 and 12A may be performed in several ways. One possible way to code collocated_picture_idx_list0, collocated_picture_idx_list1, or collocated_picture_idx, is to use fixed length coding. The maximum bits used for these syntax is designated as a variable Ceil(Log 2(max_num_ref_frames), where max_num_ref_frames specifies the maximum number of reference frames, complementary reference field pairs, and non-paired reference fields that may be used by the decoding process for inter prediction of any picture in the sequence.

For actual encoding, various conditions apply. For example, if collocated_from_l0_flag is 1 and Num_ref_idx_l0_active_minus1 is also 0, neither collocated_picture_idx_list0 nor collocated_picture_idx may be coded. Likewise, if collocated_from_l0_flag is 0 and Num_ref_idx_l1_active_minus1 is 0, neither collocated_picture_idx_list1 nor collocated_picture_idx may be coded. Depending on the coding procedure, a process following the syntax coding rules for encoding can be used for decoding.

Figure 13:
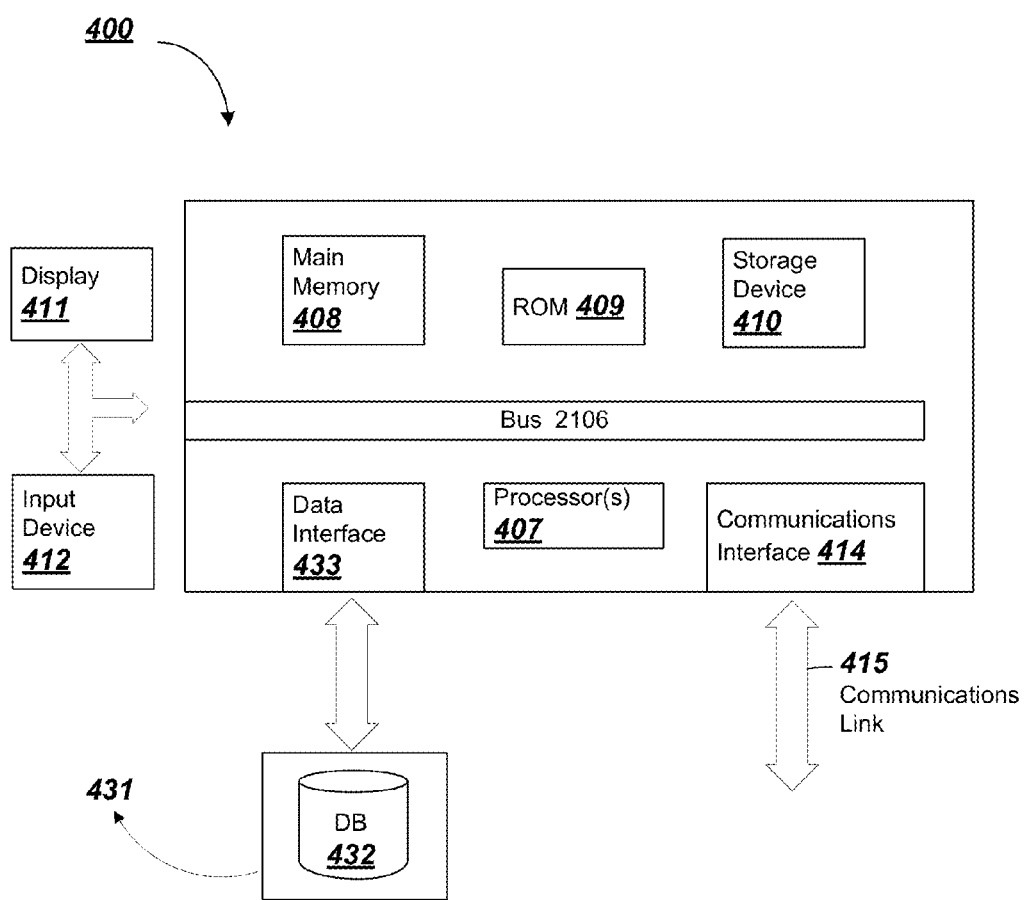
FIG. 13 depicts an exemplary embodiment of computer hardware that can be used to implement particular embodiments.

The execution of the sequences of instructions required to practice particular embodiments may be performed by a one or more computers in the system of FIG. 1. A computer system 400 that can be used will be described with reference to FIG. 13, which is a block diagram of the functional components of a computer system 400. As used herein, the term computer system 400 is broadly used to describe any computing device that can store and independently run one or more programs.

The computer system 400 can include a communication interface 414 coupled to the bus 406. The communication interface 414 provides two-way communication between computer systems 400. The communication interface 414 of a respective computer system 400 transmits and receives electrical, electromagnetic or optical signals that include data streams representing various types of signal information, e.g., instructions, messages and data. A communication link 415 links one computer system 400 with another computer system 400. For example, the communication link 415 may be a LAN, an integrated services digital network (ISDN) card, a modem, or the Internet.

A computer system 400 may transmit and receive messages, data, and instructions, including programs, i.e., application, code, through its respective communication link 415 and communication interface 414. Received program code may be executed by the respective processor(s) 407 as it is received, and/or stored in the storage device 410, or other associated non-volatile media, for later execution.

In an embodiment, the computer system 400 operates in conjunction with a data storage system 431, e.g., a data storage system 431 that contains a database 432 that is readily accessible by the computer system 400. The computer system 400 communicates with the data storage system 431 through a data interface 433.

Computer system 400 can include a bus 406 or other communication mechanism for communicating the instructions, messages and data, collectively, information, and one or more processors 407 coupled with the bus 406 for processing information. Computer system 400 also includes a main memory 408, such as a random access memory (RAM) or other dynamic storage device, coupled to the bus 406 for storing dynamic data and instructions to be executed by the processor(s) 407. The computer system 400 can further include a read only memory (ROM) 409 or other static storage device coupled to the bus 406 for storing static data and instructions for the processor(s) 407. A storage device 410, such as a magnetic disk or optical disk, may also be provided and coupled to the bus 406 for storing data and instructions for the processor(s) 407.

A computer system 400 may be coupled via the bus 406 to a display device 411, such as an LCD screen. An input device 412, e.g., alphanumeric and other keys, is coupled to the bus 406 for communicating information and command selections to the processor(s) 407.

According to one embodiment, an individual computer system 400 performs specific operations by their respective processor(s) 407 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 407 to perform the processes described herein. In alternative embodiments, hard-wired circuitry may be used in place of or in combination with software instructions. Thus, embodiments are not limited to any specific combination of hardware circuitry and/or software.

Although particular embodiments have been described above with particularity, this was merely to teach one of ordinary skill in the art how to make and use particular embodiments. Many additional modifications will fall within the scope described, as that scope is defined by the following claims.

What is claimed:

1. A method for use in encoding and decoding a group of pictures in a video stream, comprising:
   identifying a current picture in the group of pictures for encoding or decoding;
   determining a prediction type for the current picture;
   when the prediction type for the current picture is not equal to an I-type:
      identifying a collocated reference picture in the group of pictures, the collocated reference picture being a reference picture used for encoding or decoding the current picture, using a syntax to determine if an index for the collocated reference picture within a reference picture list should be accessed to identify the collocated reference picture; and
      identifying the collocated reference picture within the reference picture list using the index only when the index should be accessed to identify the collocated reference picture and, otherwise, identifying the collocated reference picture within the reference picture list using a default index; and
   using the collocated reference picture to encode or decode the current picture.

2. The method of claim 1 wherein the syntax includes at least one of:
- a reference picture set number that is the number of pictures in a reference picture set that forms the reference picture list and includes pictures prior to the current picture in decoding order to determine if the reference picture number set number minus 1 is greater than 0; or
- a flag to determine if the collocated reference picture can be located using a first reference picture list or a second reference picture list as the reference picture list.

3. The method of claim 1, wherein identifying the collocated reference picture comprises:
- providing a first reference picture set number for a reference picture set including all reference pictures that are prior to the current picture in decoding order, and that may be used in inter prediction of the current picture;
- determining if the first reference picture set number minus 1 is greater than 0, and if so providing a first reference picture list for the reference picture set;
- providing a second reference picture set number for a reference picture set including all reference pictures that are prior to the current picture in decoding order and that may be used in inter prediction of the current picture; and
- determining if the second reference picture set number minus 1 is greater than 0, and if so providing a second reference picture list in the reference picture set, wherein at least one of the first reference picture list and the second reference picture list is determined as the reference picture list.

4. The method of claim 1, wherein identifying the collocated reference picture comprises:
- indicating which reference picture in a first reference picture list and a second reference picture list includes the collocated reference picture, depending upon a state of a flag;
- if the flag is in a first state and the prediction type for the current picture is not equal to an I-type:
- providing a first reference picture set number that counts all reference pictures in the first reference picture list that are prior to a current picture in decoding order, and that may be used in inter prediction of the current picture; and
- determining if the first reference picture set number minus 1 is greater than 0, and if so identifying the collocated reference picture using the index for the collocated reference picture from the first reference picture list;
- if the flag is in a second state and the prediction type for the current picture is not equal to an I-type:
- providing a second reference picture set number that counts all reference pictures in the second reference picture list that are prior to the current picture in decoding order and that may be used in inter prediction of the current picture, and determining if the second reference picture set number minus 1 is greater than 0, and if so identifying the collocated reference picture using the index for the collocated reference picture from the second reference picture list.

5. The method of claim 3, further comprising:
- when the prediction type for the current picture is not equal to an I-type, determining from a state of a flag if the collocated reference picture can be located using the first reference picture list or the second reference picture list as the reference picture list.

6. The method of claim 3, further comprising:
- determining from the prediction type if the collocated reference picture can be located using either of the first reference picture list or the second reference picture list as the reference picture list.

7. The method of claim 6, wherein when the prediction type is B-type, the collocated reference picture is located using either of the first reference picture list or the second reference picture list, but when the prediction type is P-type, the collocated reference picture is only locatable using the first reference picture list.

8. The method of claim 3, further comprising:
- determining from the prediction type if the collocated reference picture can be located using either of the first reference picture list or the second reference picture list as the reference picture list; and
- determining from a state of a flag if the collocated reference picture can be located using the first reference picture list or the second reference picture list.

9. A decoder for processing a coded video stream that contains a group of pictures, the decoder comprising:
- a processor;
- a memory, communicatively coupled to the processor, the memory storing a plurality of instructions comprising instructions cause the processor to:
- determine a current picture in the group of pictures for decoding;
- determine a prediction type for the current picture;
- when the prediction type for the current picture is not equal to an I-type:
- determine a collocated reference picture in the group of pictures, the collocated reference picture being a reference picture for decoding the current picture, using a syntax by:
- determining, using the syntax, if an index for the collocated reference picture within a reference picture list should be accessed to identify the collocated reference picture; and
- identifying the collocated reference picture within the reference picture list using the index only when the syntax determines that the index should be accessed to identify the collocated reference picture and, otherwise, identifying the collocated reference picture within the reference picture list using a default index; and
- use the collocated reference picture to decode the current picture.

10. The decoder of claim 9 wherein the syntax includes at least one of:
- a reference picture set number that is the number of pictures in a reference picture set that forms the reference picture list and includes pictures prior to the current picture in decoding order to determine if the reference picture number set number minus 1 is greater than 0; or
- a flag to determine if the collocated reference picture can be located using a first reference picture list or a second reference picture list as the reference picture list.

11. The decoder of claim 9, wherein to identify the collocated reference picture, the instructions further cause the processor to:
- provide a first reference picture set number for a reference picture set including all reference pictures that are prior to the current picture in decoding order, and that may be used in inter prediction of the current picture;
- determine if the first reference picture set number minus 1 is greater than 0, and if so providing a first reference picture list for the reference picture set;
- provide a second reference picture set number for a reference picture set including all reference pictures that are prior to the current picture in decoding order and that may be used in inter prediction of the current picture; and determine if the second reference picture set number minus 1 is greater than 0, and if so providing a second reference picture list in the reference picture set, wherein at least one of the first reference picture list and the second reference picture list is determined as the reference picture list.

12. The decoder of claim 9, wherein to identify the collocated reference picture, the instructions further cause the processor to:

indicate which reference picture in a first list and a second list provides the collocated reference picture, depending upon a state of a flag;

if the flag is in a first state and the prediction type for the current picture is not equal to an I-type:

provide a first reference picture set number that counts all reference pictures in the first list that are prior to a current picture in decoding order, and that may be used in inter prediction of the current picture; and determine if the first reference picture set number minus 1 is greater than 0, and if so identifying the collocated reference picture using the index of the collocated reference picture from the first reference picture list;

if the flag is in a second state and the prediction type for the current picture is not equal to an I-type:

provide a second reference picture set number that counts all reference pictures in the second list that are prior to the current picture in decoding order and that may be used in inter prediction of the current picture, and determine if the second reference picture set number is greater than 1, and if so identifying the collocated reference picture using the index of the collocated reference picture from the second reference picture list.

13. The decoder of claim 11, wherein to identify the collocated reference picture, the instructions further cause the processor to:

when the prediction type for the current picture is not equal to an I-type, determine from a state of a flag if the collocated reference picture can be located using the first reference picture list or the second reference picture list as the reference picture list.

14. The decoder of claim 11, wherein to identify the collocated reference picture, the instructions further cause the processor to:

determine from the prediction type if the collocated reference picture can be located using either of the first reference picture list or the second reference picture list as the reference picture list.

15. An encoder for encoding a video stream containing a group of pictures, the encoder comprising:

a processor;

a memory, communicatively coupled to the processor, the memory storing a plurality of instructions comprising instructions that cause the processor to:

identify a current picture in the group of pictures for encoding;

determine a prediction type for the current picture;

when the prediction type for the current picture is not equal to an I-type:

identify a collocated reference picture in the group of pictures, the collocated reference picture being a reference picture used for encoding the current picture, using a syntax to determine if an index for the collocated reference picture within a reference picture list should be accessed to identify the collocated reference picture; and identify the collocated reference picture within the reference picture list using the index only when the index should be accessed to identify the collocated reference picture and, otherwise, identify the collocated reference picture within the reference picture list using a default index; and use the collocated reference picture to encode the current picture.

16. The encoder of claim 15 wherein the syntax includes at least one of:

a reference picture set number that is the number of pictures in a reference picture set that forms the reference picture list and includes pictures prior to the current picture in decoding order to determine if the reference picture number set number minus 1 is greater than 0 ; or a flag to determine if the collocated reference picture can be located using a first reference picture list or a second reference picture list as the reference picture list.

17. The encoder of claim 15, wherein to identify the collocated reference picture, the instructions further cause the processor to:

provide a first reference picture set number for a reference picture set including all reference pictures that are prior to the current picture in decoding order, and that may be used in inter prediction of the current picture;

determine if the first reference picture set number minus 1 is greater than 0, and if so providing a first reference picture list for the reference picture set;

provide a second reference picture set number for a reference picture set including all reference pictures that are prior to the current picture in decoding order and that may be used in inter prediction of the current picture; and determine if the second reference picture set number minus 1 is greater than 0, and if so providing a second reference picture list in the reference picture set, wherein at least one of the first reference picture list and the second reference picture list is determined as the reference picture list.

18. The encoder of claim 17, wherein to identify the collocated reference picture, the instructions further cause the processor to:

when the prediction type for the current picture is not equal to an I-type, determine from a state of a flag if the collocated reference picture can be located using the first reference picture list or the second reference picture list as the reference picture list.

19. The encoder of claim 17, wherein to identify the collocated reference picture, the instructions further cause the processor to:

determine from the prediction type if the collocated reference picture can be located using either of the first reference picture list or the second reference picture list as the reference picture list.

20. The encoder of claim 17, wherein to identify the collocated reference picture, the instructions further cause the processor to:

indicate which reference picture in a first list and a second list provides the collocated reference picture, depending upon a state of a flag;

if the flag is in a first state and the prediction type for the current picture is not equal to an I-type:

provide a first reference picture set number that counts all reference pictures in the first list that are prior to a current picture in decoding order, and that may be used in inter prediction of the current picture; and determine if the first reference picture set number minus 1 is greater than 0, and if so identifying the collocated reference picture by using the index of the collocated reference picture from the first reference picture list;

if the flag is in a second state and the prediction type for the current picture is not equal to an I-type:

provide a second reference picture set number that counts all reference pictures in the second list that are prior to the current picture in decoding order and that may be used in inter prediction of the current picture, and determine if the second reference picture set number minus 1 is greater than 0, and if so identifying the collocated reference picture using the index of the collocated reference picture from the second reference picture list.

21. A method for use in encoding and decoding a group of pictures in a video stream comprising:

identifying a current picture in the group of pictures for encoding or decoding;

determining a prediction type for the current picture;

when the prediction type for the current picture is not equal to an I-type:

determining a state of a flag;

when the flag is in a first state, determining an index value for a collocated reference picture in a first reference picture list only when the first reference picture list includes more than one reference picture;

when the flag is in a second state, determining an index value for the collocated reference picture in a second reference picture list only when the second reference picture list includes more than one reference picture;

selecting the collocated reference picture using the index value when the index value is determined; and using the collocated reference picture to encode or decode the current picture.

22. The method of claim 21 wherein the flag comprises a first flag, the method further comprising:

determining if the prediction type is equal to a B-type; and if the prediction type is equal to the B-type, setting a second flag to a state to indicate either the first reference picture list or the second reference picture list.

23. The method of claim 21 further comprising:

if a number of reference pictures in the first reference picture list is no more than one reference picture, not encoding the index value for the collocated reference picture in the first reference picture list or decoding the index value for the collocated reference picture in the first reference picture list.

24. The method of claim 21 further comprising:

if a number of reference pictures in the second reference list is no more than one reference picture, not encoding the index value for the collocated reference picture in the second reference picture list or decoding the index value for the collocated reference picture in the second reference picture list.

* * * * *